(12) United States Patent
Hada (10) Patent No.: US 11,019,269 B2
(45) Date of Patent: May 25, 2021

(54) IMAGE CAPTURING APPARATUS, METHOD OF CONTROLLING THE SAME, AND STORAGE MEDIUM

(71) Applicant: CANON KABUSHIKI KAISHA, Tokyo (JP)

(72) Inventor: Tetsuya Hada, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/459,912

(22) Filed: Jul. 2, 2019

(65) Prior Publication Data

US 2020/0021741 A1 Jan. 16, 2020

(30) Foreign Application Priority Data

Jul. 10, 2018 (JP) .............................. JP2018-130884
Jun. 7, 2019 (JP) .............................. JP2019-107455

(51) Int. Cl.
*H04N 5/232* (2006.01)
*H04N 5/235* (2006.01)
*H04N 9/73* (2006.01)
*G02B 7/28* (2021.01)
*G02B 13/00* (2006.01)

(52) U.S. Cl.
CPC ..... *H04N 5/23296* (2013.01); *H04N 5/23212* (2013.01); *H04N 5/23245* (2013.01); *H04N 9/73* (2013.01)

(58) Field of Classification Search
CPC .......... H04N 5/23296; H04N 5/23212; H04N 5/232133; H04N 5/23245; H04N 5/23238; H04N 5/235; H04N 5/234; H04N 5/3454; H04N 5/2628; H04N 5/2259; H04N 5/23299; H04N 9/3182; H04N 9/73; H04N 9/735; G02B 7/08; G02B 7/28; G02B 7/282; G02B 13/009; G03B 13/36
USPC ....... 348/240.1, 240.99, 240.2, 240.3, 208.6, 348/211.9, 347, 326, 345, 346, 369, 348/223.1, 229.1, 221.1, 745, 39, 317, 348/333.01, 333.09, 341, 222.1, 220.1; 396/379, 84, 141, 143, 271, 274, 296,
(Continued)

(56) References Cited

U.S. PATENT DOCUMENTS 7,623,177 B2 * 11/2009 Nakamura ............. H04N 5/225
  348/344
8,780,222 B2 * 7/2014 Inoue ................. H04N 5/23232
  348/222.1

(Continued)

FOREIGN PATENT DOCUMENTS

JP     2017-102466 A    6/2017

*Primary Examiner* — Marly S Camargo
(74) *Attorney, Agent, or Firm* — Venable LLP (57) ABSTRACT

An image capturing apparatus comprises: a reception unit configured to receive information of a zoom position of the lens unit; a setting unit configured to set a predetermined range on the basis of information of a first zoom position; a control unit configured to, when the control unit detects that the zoom position of the lens unit has been changed from the first zoom position to a second zoom position, cause driving of the focus lens to stop, and, when the control unit detects that the zoom position of the lens unit has changed from the second zoom position to within the predetermined range on a telephoto side, resuming driving of the focus lens, wherein the predetermined range is set to include the first zoom position on the telephoto side from the second zoom position.

14 Claims, 5 Drawing Sheets

(58) Field of Classification Search
USPC ....... 396/373, 378, 383, 79, 80, 82, 89, 121; 382/255; 359/354, 676, 319, 383, 410
See application file for complete search history.

(56) References Cited

U.S. PATENT DOCUMENTS

| | | | |
|---|---|---|---|
| 9,420,188 B2* | 8/2016 | Ito | H04N 5/23296 348/240.3 |
| 10,165,188 B2* | 12/2018 | Kakimoto | H04N 5/23296 348/240.3 |
| 10,681,273 B2* | 6/2020 | Kim | H04N 5/23241 348/262 |
| 2006/0187310 A1* | 8/2006 | Jnason, Jr. | H04N 5/225 348/676 |
| 2007/0242143 A1* | 10/2007 | Sugimoto | H04N 5/23245 348/240.2 |
| 2008/0219654 A1* | 9/2008 | Border | G03B 13/18 396/89 |
| 2010/0039535 A1* | 2/2010 | Maesa | H04N 5/23245 348/240.2 |
| 2011/0228120 A1* | 9/2011 | Inoue | H04N 5/228 348/222.1 |
| 2012/0062693 A1 | 3/2012 | Hada | |
| 2013/0083234 A1* | 4/2013 | Shigata | 348/360 |
| 2013/0120617 A1* | 5/2013 | Kim | H04N 5/23219 348/240.2 |
| 2015/0077593 A1* | 3/2015 | Ito | H04N 5/23296 348/240.3 |
| 2016/0306135 A1* | 10/2016 | Kakimoto | G03B 17/14 348/240.3 |

\* cited by examiner

IMAGE CAPTURING APPARATUS, METHOD OF CONTROLLING THE SAME, AND STORAGE MEDIUM

BACKGROUND OF THE INVENTION

Field of the Invention

The present invention relates mainly to an AF control technique at a time of telephoto shooting.

Description of the Related Art

When shooting a distant moving subject with a telephoto lens, it is common to perform the shooting while panning or tilting the camera to follow the subject and continually aligning the focal point with the subject by continuous AF. In moving body shooting using a telephoto lens, one may lose sight of the subject due to slight changes in subject motion or camera-shake. There has been known a method of making it easier to find a lost subject in such cases by first stopping the continuous AF and zooming to the wide angle side, and then zooming back to the telephoto side after finding the subject, and restarting the continuous AF (see Japanese Patent Laid-Open No. 2017-102466).

For digital cameras with an integrated lens, the zoom is often electrically powered and the method disclosed in Japanese Patent Laid-Open No. 2017-102466 can be implemented. However, in interchangeable lens type single-lens reflex type digital cameras, the zoom is mostly manual, and when a zoom to the wide angle side is first performed, it is difficult to return to the same zoom position on the telephoto side again, and consequently, there is a problem in that continuous AF cannot be restarted.

SUMMARY OF THE INVENTION

The present invention has been made in view of the above-mentioned problems, and the present invention provides an image capturing apparatus capable of smoothly performing telephoto shooting of a moving subject even when a zoom is manually operated.

According to a first aspect of the present invention, there is provided an image capturing apparatus operable to capture a subject image formed by a lens unit having a focus lens and a zoom operation member for performing a zoom operation, the apparatus comprising: at least one processor or circuit configured to function as the following units: a reception unit configured to receive information of a zoom position of the lens unit; a setting unit configured to set a predetermined range on the basis of information of a first zoom position received by the reception unit; a control unit configured to, when the control unit detects that the zoom position of the lens unit has been changed from the first zoom position to a second zoom position more to a wide angle side than the first zoom position, change shooting preparation processing from a first processing mode to a second processing mode, and, when the control unit detects that the zoom position of the lens unit has changed from the second zoom position to within the predetermined range on a telephoto side from the second zoom position, return the shooting preparation processing from the second processing mode to the first processing mode, wherein the predetermined range is set to include the first zoom position more to the telephoto side than the second zoom position.

According to a second aspect of the present invention, there is provided a method for controlling an image capturing apparatus for imaging a subject image formed by a lens unit having a focus lens and a zoom operation member for performing a zoom operation, the method comprising: receiving information of a zoom position of the lens unit; setting a predetermined range on the basis of information of a first zoom position received in the receiving; detecting that the zoom position of the lens unit has been changed from the first zoom position to a second zoom position more to a wide angle side than the first zoom position; changing shooting preparation processing from a first processing mode to a second processing mode; and, when it is detected that the zoom position of the lens unit has changed from the second zoom position to within the predetermined range on a telephoto side from the second zoom position, returning the shooting preparation processing from the second processing mode to the first processing mode, wherein the predetermined range is set to include the first zoom position on the telephoto side from the second zoom position.

Further features of the present invention will become apparent from the following description of exemplary embodiments with reference to the attached drawings.

DESCRIPTION OF THE EMBODIMENTS

Embodiments of the present invention will be described below with reference to the accompanying drawings, but the present invention is not limited to the following embodiments. Note that the following embodiments are for illustrating advantageous forms of the invention and do not limit the scope of the invention.

First Embodiment

Figure 1:
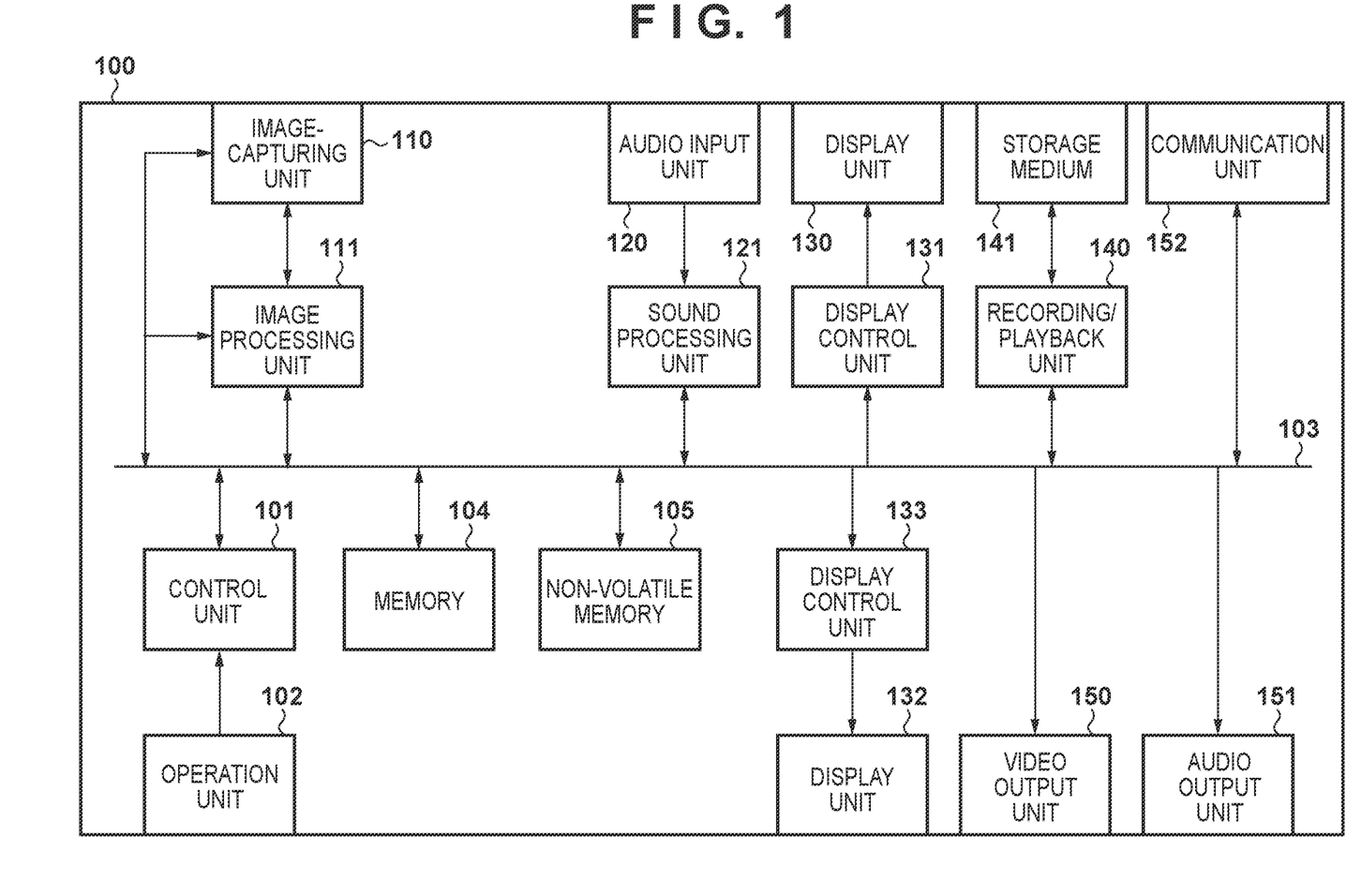
FIG. 1 is a block diagram illustrating a configuration of a digital single-lens reflex camera according to an embodiment of an image capturing apparatus of the present invention.

In the present embodiment, a digital single-lens reflex camera is exemplified as an image capturing apparatus, but the present invention is also applicable to cellular phones and the like. FIG. 1 is a block diagram illustrating a configuration of an image capturing apparatus 100 according to a first embodiment of the present invention.

In FIG. 1, a control unit 101 includes, for example, a CPU (MPU), memories (DRAM and SRAM), and a non-volatile memory (EEPROM), and the like. Various processes (programs) are executed to control the blocks of the image capturing apparatus 100 and to control data transfer between the blocks. The control unit 101 controls the blocks of the image capturing apparatus 100 in accordance with operation signals from an operation unit 102 that receive an operation from a user. In addition, the control unit 101 analyzes images obtained by an image processing unit 111, which will be described later, and controls the respective blocks of the image capturing apparatus 100 in accordance with the analysis results.

The operation unit 102 includes, for example, switches for inputting various operations related to shooting, such as a power button, a still image recording button, a moving image recording start button, and an autofocus button. It also includes a menu display button, a decision button, a cursor key, a pointing device, a touch panel, and the like, and when these keys or buttons are operated by a user, an operation signal is transmitted to the control unit 101.

A bus 103 is a general-purpose bus for sending various data, control signals, instruction signals, and the like to the respective blocks of the image capturing apparatus 100. A nonvolatile memory 105 is an electrically erasable/recordable memory, and stores constants, programs, and the like for the operation of the control unit 101.

An image capturing unit 110 converts an optical image of a subject (subject image) formed by lenses of a lens unit and whose light quantity is controlled by a diaphragm into an image signal by an image pickup device such as a CCD or a CMOS sensor, converts the image signal into an analog signal, converts the analog signal into a digital signal, and transmits the converted signal to the image processing unit 111. The lens unit of the image capturing unit 110 is a detachable interchangeable lens, and includes a focus lens, a zoom lens, and a drive unit for driving the focus lens. The drive unit is an actuator that can move the focus lens in the optical axis direction based on a command from the control unit 101 of the image capturing apparatus, and can use a voice coil motor, a stepping motor, an ultrasonic motor, or the like. In addition, by driving the lenses based on a command from the control unit 101, a focus lens position can be adjusted based on focal point detection. The interchangeable lens also includes a zoom ring by which a manual zoom can be performed, similar to a lens for conventional single-lens reflex cameras. It also includes a detection device, such as an encoder for detecting the zoom position, and a signal from the detection device enable the control unit 101 to know the present zoom position of the interchangeable lenses.

The image processing unit 111 performs, based on setting values, white balancing processing and image quality adjustment processing for adjusting colors, brightness, and the like on an inputted digital image signal. The image signal processed by the image processing unit 111 is transmitted by the control unit 101 to a memory 104, a video output unit 150, display control units 131 and 133, and the like, which will be described later.

In the present embodiment, for example, the image capturing unit 110 has an "optical zoom" function and an "optical image blur correction" function, and the image processing unit 111 has an "electronic zoom" function and an "electronic image blur correction" function. Here, the "optical zoom" function and the "electronic zoom" function are functions for enlarging obtained images in response to user operations. The "optical image blur correction" function and the "electronic image blur correction" function are functions for preventing shaking of the image due to vibrations of the main body of the image capturing apparatus 100. These functions may be used simultaneously, alternatingly, or alone under the control of the control unit 101.

Here, the "optical zoom" function is a function in which the lenses in the optical system are moved by a zoom ring operation on the interchangeable lens of the image capturing unit 110 by the user, and the optical image of the subject to be imaged is enlarged/reduced. The "electronic zoom" function is a process in which the image processing unit 111 generates an image signal in which an image obtained by cutting out a part of an image generated by the image capturing unit 110 is enlarged in response to the user's operation on a zoom key of the operation unit 102. In addition, an "optical image blur correction" function is a function of calculating a movement amount of the lens based on a value of an acceleration signal from a vibration detection unit (not shown) and moving the lens to prevent shaking of an acquired image. An "electronic image blur correction" function is a function of preventing shaking of the image by adjusting the position of the image signal acquired by the image capturing unit 110 based on a value of an acceleration signal from a vibration detection unit (not shown). The "electronic image blur correction" function can also be realized by shifting a readout position of the image pickup device of the image capturing unit 110 based on a value of the acceleration signal from the vibration detection unit (not shown). Since these functions are well-known techniques, detailed description thereof will be omitted.

An audio input unit 120 collects (sound acquisition) sound around the image capturing apparatus 100 by, for example, a built-in omni-directional microphone or an external microphone connected via an audio input terminal, performs an analog-to-digital conversion on the sound, and transmits the result to an audio processing unit 121. The audio processing unit 121 performs audio-related processing such as processing for optimizing the level of an inputted digital audio signal. The audio signal processed by the audio processing unit 121 is transmitted to the memory 104 by the control unit 101. The memory 104 temporarily stores an image signal and an audio signal obtained from the image processing unit 111 and the audio processing unit 121.

The image processing unit 111 and the audio processing unit 121 read out the image signal and the audio signal temporarily stored in the memory 104, encode the image signal and encode the audio signal, and the like, and generate a compressed image signal, a compressed audio signal, and the like. The control unit 101 transmits the compressed image signal and the compressed audio signal to a recording/playback unit 140.

The recording/playback unit 140 records the compressed image signal and the compressed audio signal generated by the image processing unit 111 and the audio processing unit 121, and control data related to shooting, and the like in a storage medium 141. When the audio signal is not to be compressed and encoded, the control unit 101 transmits the audio signal generated by the audio processing unit 121 and the compressed image signal generated by the image processing unit 111 to the recording/playback unit 140 and records them in the storage medium 141. Here, the storage medium 141 may be a storage medium built into the image capturing apparatus or a removable storage medium, and may be capable of recording a compressed image signal, a compressed audio signal, an audio signal, various data, and the like generated by the image capturing apparatus 100. For example, the storage medium 141 may include any type of storage medium, such as a hard disk, an optical disk, a magneto-optical disk, a CD-R, a DVD-R, a magnetic tape, non-volatile semi-conductor memory, flash memory, and the like.

In addition, the recording/playback unit 140 reads (plays back) a compressed image signal, a compressed audio signal, an audio signal, various data, and programs recorded in the storage medium 141. The control unit 101 transmits the read compressed image signal and compressed audio signal to the image processing unit 111 and the audio processing unit 121. The image processing unit 111 and the audio processing unit 121 temporarily store the compressed image signal and the compressed audio signal in the memory 104, decode the compressed image signal and the compressed audio signal according to the predetermined procedures, and transmit the decoded audio signal to an audio output unit 151 and the decoded image signal to the video output unit 150 and the display control unit 131, respectively. When the audio signal is recorded uncompressed in the storage medium 141, the control unit 101 transmits the audio signal directly to the audio output unit 151.

The audio output unit 151 includes, for example, an audio output terminal, and transmits audio signals for outputting audio from a connected earphone, speaker, or the like. The audio output unit 151 may be a speaker built into the image capturing apparatus 100 for outputting sound according to an audio signal. The video output unit 150 includes, for example, a video output terminal, and transmits image signals to display a video on a connected external display or the like. Also, the audio output unit 151 and the video output unit 150 may be one integrated terminal, for example, a terminal such as an HDMI® (High-Definition Multimedia Interface) terminal.

In addition, the display control unit 131 displays an image based on an image signal transmitted from the image processing unit 111, an operation screen (menu screen) for operating the image capturing apparatus 100, and the like on a display unit 130. The display unit 130 may be any display device such as, for example, a liquid crystal display, an organic electroluminescence display, or electronic paper. A display unit 132 is an optical finder, and the display control unit 133 causes the display unit 132 to display a through image, shooting setting information, and the like. When the user operates a display switching button of the operation unit 102, it is possible to switch whether the through image is displayed on the display unit 130 or on the display unit 132.

A communication unit 152 performs communication between the image capturing apparatus 100 and an external apparatus, and transmits and receives data such as an audio signal, an image signal, a compressed audio signal, and a compressed image signal, for example. In addition, it transmits and receives control signals for shooting, such as shooting start and end commands, and other information. The communication unit 152 is, for example, a radio communication module such as an infrared communication module, a Bluetooth® communication module, a wireless LAN communication module, a Wireless USB, or a GPS receiver.

Next, the normal operation of the image capturing apparatus 100 of the present embodiment will be described. In the image capturing apparatus 100 of the present embodiment, when the user operates the power button of the operation unit 102, the operation unit 102 outputs an activation instruction to the control unit 101. In response to this instruction, the control unit 101 controls a power supply unit (not shown) to supply power to the respective blocks of the image capturing apparatus 100.

When the power is supplied, the control unit 101, by an instruction signal from the operation unit 102, confirms which mode a mode changeover switch of the operation unit 102 is in out of, for example, a still image shooting mode, a moving image shooting mode, a playback mode, or the like.

In the still image shooting mode, the image capturing apparatus 100 performs shooting by the user operating a still image recording button of the operation unit 102 in the shooting standby state, and a compressed image signal is recorded in the storage medium 141. Then, the shooting standby state is entered again. In the moving image shooting mode, the image capturing apparatus 100 starts shooting by the user operating the moving image recording start button of the operation unit 102 in the shooting standby state, and a compressed image signal and a compressed audio signal or an audio signal are recorded in the storage medium 141. Then, when the user operates a moving image recording end button of the operation unit 102, the shooting is ended, and the shooting standby state is resumed. In the playback mode, a compressed image signal and a compressed audio signal or an audio signal related to a file selected by the user are played back from the storage medium 141, and an audio signal is outputted from the audio output unit 151 and an image displayed on the display unit 130.

First, the still image shooting mode will be described. When the still image shooting mode is set by the operation unit 102, as described above, the control unit 101 first sets the blocks of the image capturing apparatus 100 to the shooting standby state.

In the shooting standby state, the image processing unit 111 transmits an image signal to the display control unit 131 and thereby causes the display unit 130 to display an image related to the image signal. The user prepares for shooting while watching a screen thus displayed. When a shooting instruction signal is transmitted by the user operating the still image recording button of the operation unit 102 in the shooting standby state, the control unit 101 transmits a shooting control signal to the respective blocks of the image capturing apparatus 100, and performs control so as to perform the following operations.

The image capturing unit 110 converts, into an image signal by an image pickup device, an optical image of the subject formed by the lens, performs an analog-to-digital conversion thereon, and transmits the result to the image processing unit 111. The image processing unit 111 performs image quality adjustment processing (adjustment of white balance, color, brightness, etc.) on the inputted digital image signal based on set values. Then the image signal processed by the image processing unit 111 is transmitted to the memory 104, the video output unit 150, and the display control unit 131 by the control unit 101. Here, the user can confirm the shot still image by viewing the image displayed on the display unit 130.

The image processing unit 111 reads out the image signal temporarily stored in the memory 104, performs predetermined encoding of the image signal, generates a compressed image signal, and outputs the compressed image signal to the recording/playback unit 140. The recording/playback unit 140 writes the compressed image signals to the storage medium 141 as a still image file under the management of a file system such as UDF, FAT, or the like.

When the encoding operation by the image processing unit 111 is completed, the control unit 101 transmits control signals to the respective blocks of the image capturing apparatus 100 so as to transition to the shooting standby state, and returns to the shooting standby state.

Next, the moving image shooting mode will be described. When the moving image shooting mode is set by the operation unit 102, first, as described above, the control unit 101 sets the blocks of the image capturing apparatus 100 to the shooting standby state.

In the shooting standby state, the image processing unit 111 transmits an image signal to the display control unit 131 and causes the display unit 130 to display an image related to the image signal. The user prepares for shooting while watching the screen thus displayed. When a shooting start instruction signal is transmitted by the user operating a moving image recording start button of the operation unit 102 in the shooting standby state, the control unit 101 transmits a shooting start control signal to the respective blocks of the image capturing apparatus 100, and performs control so as to perform the following operations.

The image capturing unit 110 converts, into an image signal by an image pickup device, the optical image of the subject formed by the lens, performs an analog-to-digital conversion thereon, and transmits the result to the image processing unit 111. The image processing unit 111 performs image quality adjustment processing (adjustment of white balance, colors, brightness, etc.) on the inputted digital image signal based on set values. The image signal processed by the image processing unit 111 is transmitted to the display control unit 131 and the memory 104 by the control unit 101. The display control unit 131 causes the display unit 130 to display an image related to the received image signal.

In contrast, the audio input unit 120 digitally converts an analog audio signal obtained by the microphone, and transmits the obtained digital audio signal to the audio processing unit 121. The audio processing unit 121 performs a process of optimizing the level of the inputted digital audio signal, and outputs the audio signal. The control unit 101 transmits the audio signal processed by the audio processing unit 121 to the memory 104.

The image processing unit 111 and the audio processing unit 121 read out an image signal and an audio signal temporarily stored in the memory 104, perform predetermined encoding thereon, and generate a compressed image signal, a compressed audio signal, and the like. The control unit 101 synthesizes the compressed image signal and the compressed audio signal to form a data stream, and outputs the data stream to the recording/playback unit 140. The recording/playback unit 140 writes the data stream into the storage medium 141 as one moving image file under the management of a file system such as UDF, FAT, or the like. When the audio is not compressed, the control unit 101 outputs the audio signal generated by the audio processing unit 121 to the recording/playback unit 140 together with the compressed image signal generated by the image processing unit 111. Then, as described above, the recording/playback unit 140 writes the data stream into the storage medium 141 as one moving image file under the management of a file system such as UDF, FAT, or the like. While a moving image is being captured, the above-described operation is continued.

In addition, during shooting, the control unit 101 transmits various control signals to the image capturing unit 110, the image processing unit 111, the audio processing unit 121, and the like in response to a user operation on the operation unit 102, or in response to the result of analyzing an image signal generated by the image processing unit 111. For example, a control signal for moving a lens and adjusting the aperture is transmitted to the image capturing unit 110, and a control signals for image or audio adjustment are transmitted to the image processing unit 111 and the audio processing unit 121.

In addition, "optical zoom" can be performed by a zoom ring operation by the user on the interchangeable lens during shooting. Further, the image processing unit 111 can be caused to perform an "electronic zoom" by the user operating a zoom key of the operation unit 102. The control unit 101 causes an "optical image blur correction" function of the image capturing unit 110 and an "electronic image blur correction" function of the image processing unit 111 to operate based on an acceleration signal detected by the vibration detection unit (not shown).

Then, when the user operates a moving image recording end button of the operation unit 102 to transmit a shooting end instruction signal to the control unit 101, the control unit 101 transmits a shooting end control signal to the respective blocks of the image capturing apparatus 100, and performs control so as to perform the following operations.

The image processing unit 111 and the audio processing unit 121 stop transmitting the image signal and the audio signal to the memory 104, respectively. Then, a remaining image signal and audio signal stored in the memory 104 are read out, predetermined encoding is performed thereon, and a compressed image signal, a compressed audio signal, or the like are generated.

The control unit 101 synthesizes the final compressed image signal and the compressed audio signal, forms a data stream, and outputs the data stream to the recording/playback unit 140. If the audio is not to be compressed, the control unit 101 outputs the audio signal generated by the audio processing unit 121 and the compressed image signal to the recording/playback unit 140.

The recording/playback unit 140 writes the data stream into the storage medium 141 as one moving image file under the management of a file system such as UDF, FAT, or the like. When the data stream supply is stopped, the control unit 101 performs control so as to perform the following operations in order to generate a thumbnail.

The recording/playback unit 140 reads out the compressed image signal of the first frame of a moving image file recorded in the storage medium 141, and transmits the compressed image signal to the image processing unit 111. The image processing unit 111 temporarily stores the compressed image signal in the memory 104, and decodes the compressed image signal according to a predetermined procedure. Next, the image processing unit 111 performs predetermined encoding for a thumbnail in relation to the obtained image signal to generate a thumbnail compressed image signal. Then, the control unit 101 outputs the thumbnail compressed image signal to the recording/playback unit 140. The recording/playback unit 140 writes the thumbnail compressed image into the storage medium 141 so that the thumbnail compressed image is combined with the underlying moving image file under the management of a file system such as UDF, FAT, or the like, and thereby completes the moving image file and stops the recording operation.

Upon stopping the recording operation, the control unit 101 transmits control signals to the respective blocks of the image capturing apparatus 100 so as to transition to the shooting standby state, and returns to the shooting standby state.

In response to a user operation on the operation unit 102, a copyright owner name and a creator name can be stored in the nonvolatile memory 105. Each time the operation unit 102 is operated, the copyright owner name and the creator name stored in the nonvolatile memory 105 can be changed. The copyright owner name and the creator name stored in the nonvolatile memory 105 are recorded as metadata in a still image file or a moving image file in accordance with the shooting process.

Next, the playback mode will be described. When the playback mode is set by the operation unit 102, the control unit 101 transmits control signals to the blocks of the image capturing apparatus 100 so as to transition to the playback state, and performs the following operations.

The recording/playback unit 140 reads a still image file composed of a compressed image signal recorded in the storage medium 141, or a moving image file composed of a compressed image signal and a compressed audio signal or an audio signal. The control unit 101 sends the read compressed image signal and compressed audio signal to the image processing unit 111 and the audio processing unit 121. If the audio signal is uncompressed, the control unit 101 transmits the audio signal to the audio output unit 151.

The image processing unit 111 and the audio processing unit 121 temporarily store the compressed image signal and the compressed audio in the memory 104, and decode them by predetermined procedures. The control unit 101 transmits the decoded audio signal to the audio output unit 151, and transmits the decoded image signal to the video output unit 150 and the display control unit 131. The display control unit 131 causes the display unit 130 to display video relating to the input image signal, and the audio output unit 151 outputs audio relating to the input audio signal from a built-in speaker or a connected earphone or speaker. The image capturing apparatus of the present embodiment performs recording and playback of still images and moving images as described above.

Figure 2:
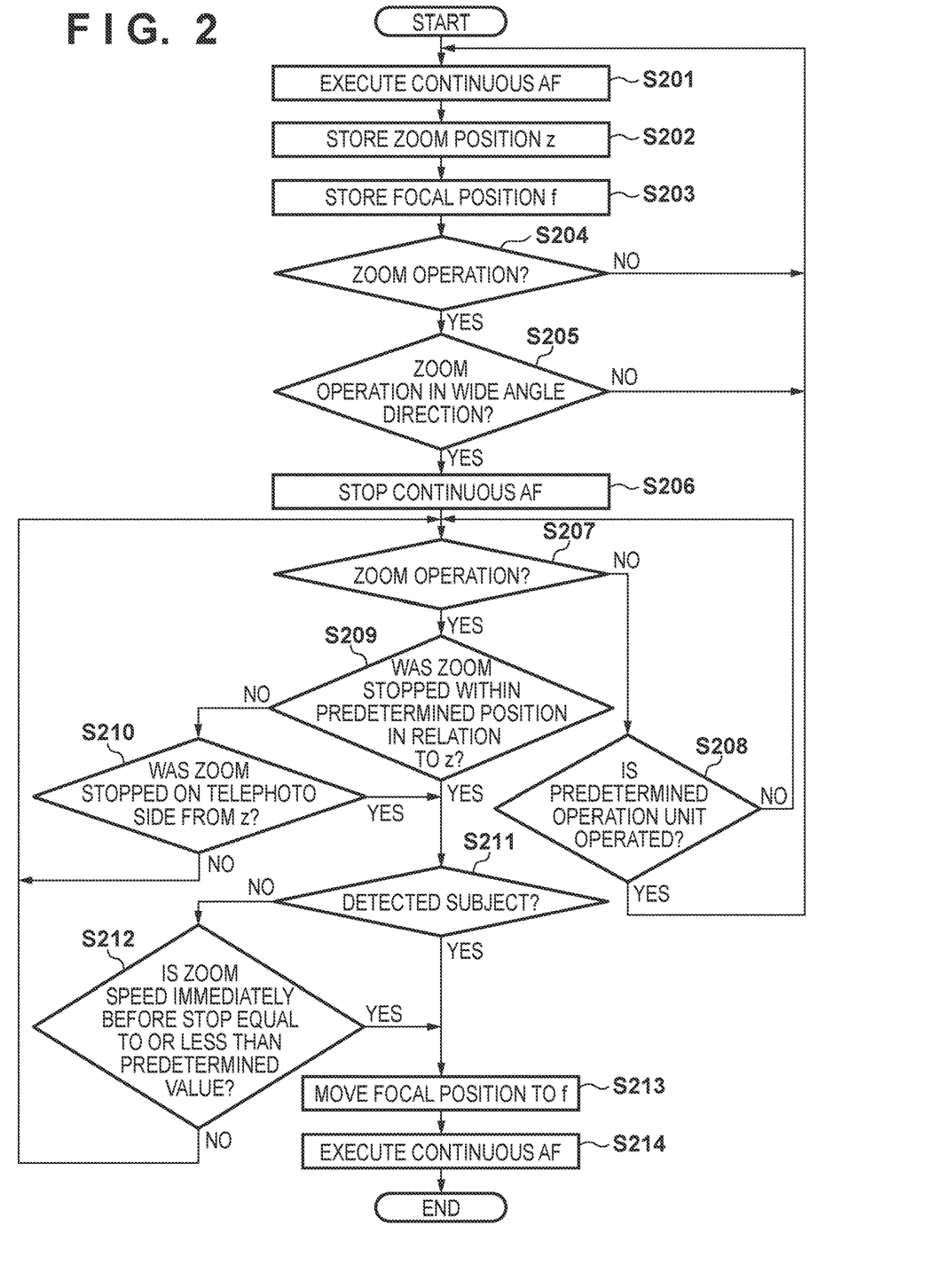
FIG. 2 is a flowchart illustrating a framing assist operation in a first embodiment.

Next, a characteristic process of the present embodiment which is a process for a case in which while following a distant moving subject with a telephoto lens, the subject is lost in the case of shooting will be described. In the present embodiment, it is assumed that the user first intentionally performs a manual zoom out to a wide angle side in order to search for the lost subject. When the zoom out is performed by the user, the control unit 101 stops continuous AF (autofocus for continuously adjusting the focal point with the subject). Thereafter, when the user discovers the subject and intentionally returns to the original telephoto side zoom position, the control unit 101 detects the return to a position close to the original zoom position or that a zoom toward the telephoto side was performed, and automatically resumes continuous AF driving. This operation is hereinafter referred to as framing assist. Also, the control unit 101 restarts the continuous AF when a predetermined operation unit in the operation unit 102 is operated, regardless of whether or not the zoom position has returned to the original position. These framing assist operations will be described with reference to the flowchart of FIG. 2. It should be noted that the flowchart of FIG. 2 is assumed to start from a condition in which shooting is being performed while following a subject with the telephoto lenses.

In step S201, the control unit 101 executes continuous AF and proceeds to step S202. The continuous AF may be a continuous AF using contrast-based focal point detection, or continuous AF using phase-contrast-based focal point detection. When the focal point detection of the contrast method is performed, the control unit 101 acquires a focal point evaluation value indicating the sharpness (contrast) of the image based on the image signal outputted from the image pickup device, and detects the maximum value of the focal point evaluation value, that is, a position of the focus lens where the contrast is high, as an in-focus position (focal point detection). Then, contrast AF is performed by moving the focus lens to the detected focal position. Continuous AF can be executed by periodically performing this operation (for example, every frame). When performing focal point detection by the phase difference method, the control unit 101 calculates a correlation between a pair of signals having parallax, and detects a position having a defocus amount of 0 as a focal position. A range in which the defocus amount is equal to or less than a predetermined value may be regarded as an in-focus position. Then, phase difference AF is performed by moving the focus lens to the detected in-focus position. Continuous AF can be executed by periodically performing this processing. The pair of signals having parallax are based on luminous fluxes passing through different pupil regions in the optical system, and may be acquired from an image pickup device (image plane phase difference AF) or may be acquired from a sensor for focal point detection provided independently of the image pickup device.

In step S202 the present zoom position z is stored in the memory 104 and the processing proceeds to step S203. In step S203, the present focal position f is stored in the memory 104, and the processing proceeds to step S204. In step S204, it is determined whether or not the lens of the image capturing unit 110 has been manually zoomed by the user. When it is determined that a zoom operation has been performed, the process proceeds to step S205, and when it is determined that a zoom operation has not been performed, the process returns to step S201. In step S205, it is determined whether or not the lens of the image capturing unit 110 was manually zoomed by the user in the wide angle direction. When it is determined that a zoom operation has been performed in the wide angle direction, the processing proceeds to step S206, and when it is determined that a zoom operation has not been performed in the wide angle direction, the processing returns to step S201. In step S206, continuous AF is stopped, and the processing proceeds to step S207. When the continuous AF is stopped in step S206, the focal point detection may be continued if focus lens position control based on the focal point detection is stopped. In a case where the lens mounted on the image capturing apparatus is of a rear focus type, the in-focus position changes according to the position of the zoom lens even if the subject distance does not change. Therefore, when the position of the focus lens is not mechanically configured to move in accordance with the position of the zoom lens (a mechanical cam is not arranged), computer zoom (CZ) control is performed even if the continuous AF is stopped. Since the computer zoom control controls the position of the focus lens based on the position of the zoom lens based on electronic cam information, this control is distinguished from focus lens position control based on focal point detection. In step S207, it is determined whether or not the lens of the image capturing unit 110 has been manually zoomed by the user again. When it is determined that a zoom operation has been performed, the processing proceeds to step S209, and when it is determined that a zoom operation has not been performed, the processing proceeds to step S208. In step S208, it is determined whether or not a predetermined operation unit in the operation unit 102 has been operated (for example, whether or not a shutter button has been half-pressed). When it is determined that an operation has been performed, the process returns to step S201, and when it is determined that an operation has not been performed, the process returns to step S207.

In step S209, the position of the stop of the zoom operation is compared with the zoom position z stored in step S202, and it is determined whether the zoom operation stopped with the difference therebetween within a predetermined range. In a case where it is determined that the stoppage was within the predetermined range from the zoom position z, the process proceeds to step S211, and in a case where it is determined that stoppage has not been performed, the process proceeds to step S210. In step S210, it is determined whether or not the zoom operation is stopped on the telephoto side from the zoom position z stored in step S202. If it is determined that the operation stopped on the telephoto side, the processing proceeds to step S211, and if it is determined that the operation is not stopped on the telephoto side, the processing returns to step S207.

In step S211, it is determined whether or not the image processing unit 111 has detected a subject such as a human face or a moving object. When it is determined that a subject is detected, the process proceeds to step S213, and when it is determined that subject has not been detected, the process proceeds to step S212. In step S212, it is determined whether or not the zoom speed immediately before the stop is equal to or less than a predetermined value. If it is determined that the zoom speed is equal to or less than the predetermined value, the process proceeds to step S213, and if it is determined that the zoom speed is not equal to or less than the predetermined value, the process returns to step S207.

In step S213, the focal position is moved to the focal position f stored in step S203, and the processing proceeds to step S214. In step S214, continuous AF is executed, and the processing ends.

As described above, in the present embodiment, the zoom position and the focal position prior to the subject search are stored even during a manual zoom, and the continuous AF operation is automatically restarted when the original zoom position or an even more telephoto position is returned to after the subject search. Therefore, it is possible to smoothly perform focusing. Further, by operating a predetermined operation unit, it is possible to again return to a state prior to the subject search at any time.

In the above-described embodiment, when it is determined in step S204 and step S205 that the user has performed a zoom operation in the wide angle direction, the continuous AF operation is temporarily stopped to make it easier to find the lost subject. However, the determination as to whether or not to temporarily stop the continuous AF operation is not limited to this. For example, for the determination as whether or not to temporarily stop the continuous AF operation, in addition to whether a zoom operation is performed in the wide angle direction, conditions such as whether or not the amount of change in the zoom magnification is equal to or greater than the predetermined value, and whether or not the speed of a zoom out is faster than a predetermined zoom speed may be added. This can prevent an unintentional stopping of continuous AF in a zoom operation such as one for fine-tuning the angle of view which is not for a subject search. Further, in the above-described embodiment, the stopping of the continuous AF is performed in step S206, but an image quality process such as exposure control and white balance control may also be stopped. Although continuous AF is executed in step S214, image quality processes such as auto exposure control (AE) and white balance control (WB) may be also executed. By doing so, even after the subject search, shooting can be performed having returned to image quality settings.

As described above, the image capturing apparatus according to the present embodiment changes at least one of shooting preparation processing processes, such as an AF process, an AE process, and a WB process, from an operation state (first processing mode) to a stop state (second processing mode), when it detects that the zoom has moved to the wide angle side by the user even during a manual zoom. Further, when a subject search is performed and then the original zoom position or an even more telephoto position is returned to, the shooting preparation processing that was stopped at the time of zooming out is returned to the operation state. As a result, it is possible to shorten the time required to return to a shooting condition (focus, exposure, white balance) suitable for shooting when returning to the original zoom position or an even more telephoto position after the subject search.

Second Embodiment

Figure 3:
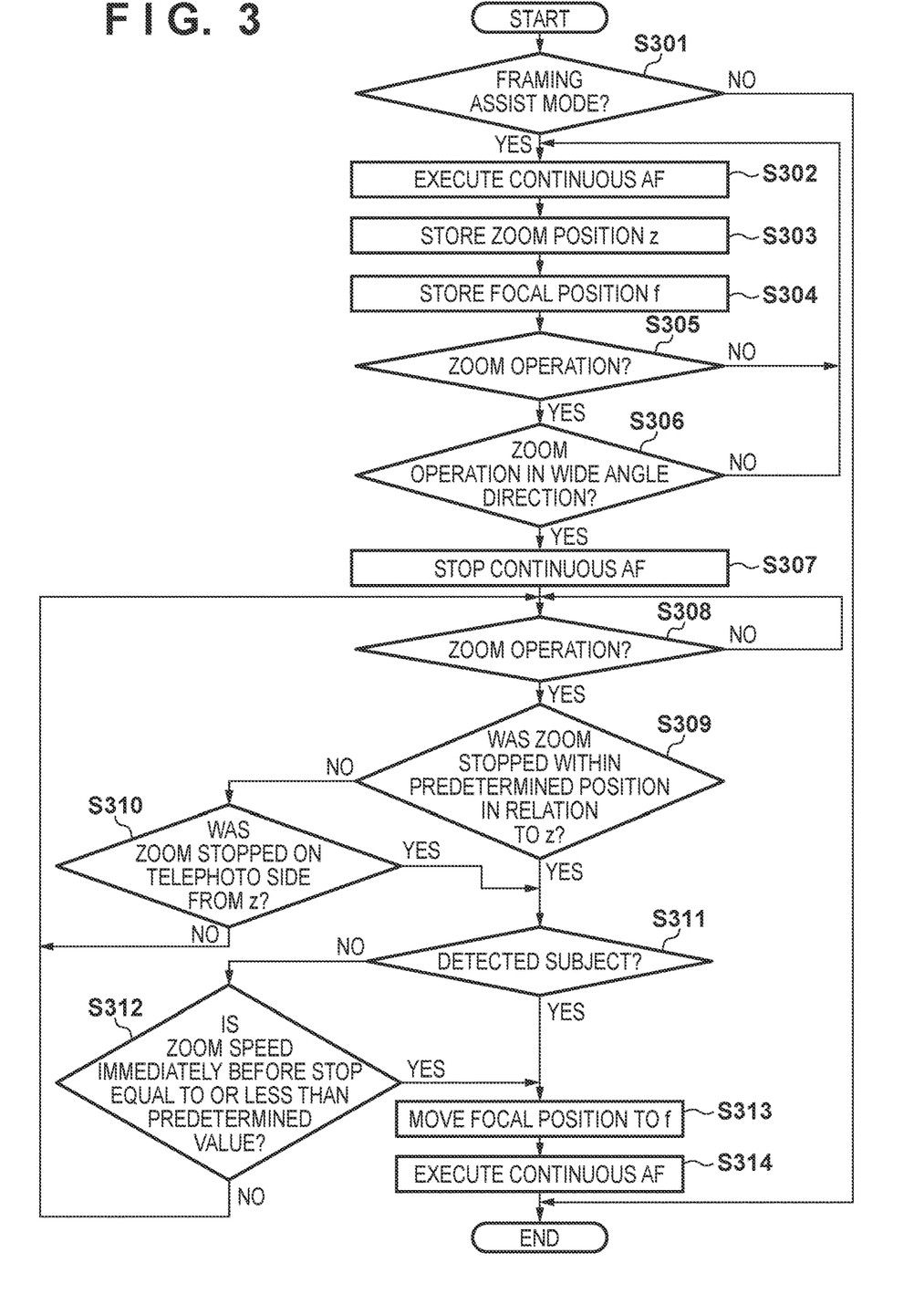
FIG. 3 is a flowchart illustrating the framing assist operation in a second embodiment.

Next, a second embodiment of the present invention will be described. In the present embodiment, when the user selects the predetermined operation mode (framing assist mode) by an operation on the operation unit 102, a similar operation as in the first embodiment is performed. FIG. 3 is a flowchart illustrating the framing assist operation in the second embodiment.

In step S301, the control unit 101 determines whether or not the image capturing apparatus 100 is set to a framing assist mode. When it is determined that the framing assist mode is set, the processing proceeds to step S302, and when it is determined that the framing assist mode is not set, the processing is ended.

The processes from step S302 to step S308 are the similar to the processes from step S201 to step S207, and therefore descriptions thereof are omitted. When it is determined that a zoom operation has been performed in step S308, the process proceeds to step S309, and when it is determined that a zoom operation has not been performed, the processing waits as it is.

The processes from step S309 to step S314 are similar to the processes from step S209 to step S214, and therefore descriptions thereof are omitted.

As described above, in the present embodiment, by explicitly providing the framing assist mode, the stopping and restarting of the continuous AF at unintended times can be prevented.

The method of setting the framing assist mode is not particularly limited. Setting may be performed on a menu screen, or an operation member such as a button for instructing a transition to the framing assist mode may be provided, and the framing assist mode may be transitioned to upon operation of that operation member.

Third Embodiment

Figure 4:
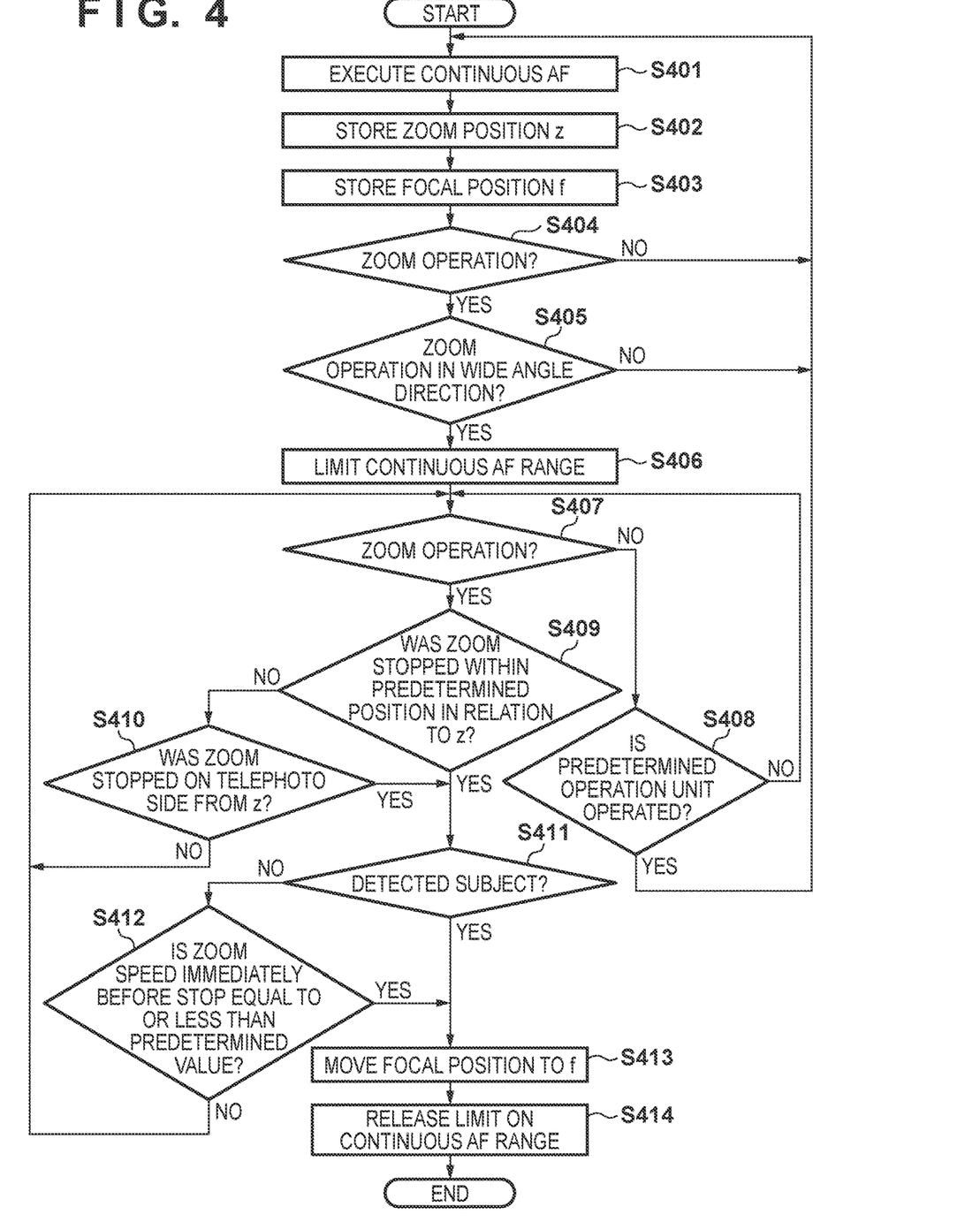
FIG. 4 is a flowchart illustrating the framing assist operation in a third embodiment.

Next, a process in which a distance measurement range for continuous AF is limited when a zoom to the wide angle side is performed in order to search for a lost subject, and thereafter the limitation on the distance measurement range of the continuous AF is released after a telephoto side zoom or when a predetermined operation unit 102 is operated will be described with reference to FIG. 4.

The processes of step S401 to step S405 are similar to step S201 to step S205, and therefore descriptions thereof are omitted.

In step S406, the range of the continuous AF is limited to a predetermined focal position range in related to the focal position f, stored in step S403, as a reference, and the processing proceeds to step S407.

The processes of step S407 to step S413 are similar to step S207 to step S213, and therefore descriptions thereof are omitted.

In step S414, the limitation on the distance measurement range of the continuous AF performed in step S406 is released.

As described above, by limiting the distance measurement range of the continuous AF during a subject search by a zoom operation, the subject can be searched for easily because focus is maintained during a zoom operation of a predetermined amount. In this embodiment, similarly to in the first embodiment, instead of setting a limit on the distance measurement range for continuous AF, a limit may be put on the distance measurement range for AE processing or WB processing.

In this manner, during zooming out, at least one of the shooting preparation processing processes, such as AF processing, AE processing, and WB processing, is temporarily changed from a non-limited state (first processing mode) to a limited state (second processing mode). The change of the process during zooming out is a change such that the shooting condition tends not to change from the shooting condition prior to the subject search. As a result, it is possible to quickly return to a shooting condition (focusing, exposure, white balancing) suitable for shooting when the original zoom position or an even more telephoto position is returned to after the subject search.

Fourth Embodiment

Next, a fourth embodiment of the present invention will be described. In the first embodiment, when it is determined that the user has performed a zoom operation in the wide angle direction, the continuous AF operation is temporarily stopped, thereby making it easier to find the lost subject. In the present embodiment, by temporarily stopping the reception of an operation for changing shooting setting items instead of the continuous AF operation, the possibility that an image unintended by the user will be shot when the original zoom position or an even more telephoto position is returned to after the subject search is reduced.

Incidentally, the reception of a change operation indicates that a setting is changed when the change operation is received, and configuration may be taken such that mechanically a button cannot be pressed and configuration may be taken such that there is no response even if a button is pressed. Further, in the case of operations on a touch panel, configuration may be taken such that a display for an operation is not performed on the touch panel, or such that display is performed but there is no response thereto.

Figure 5:
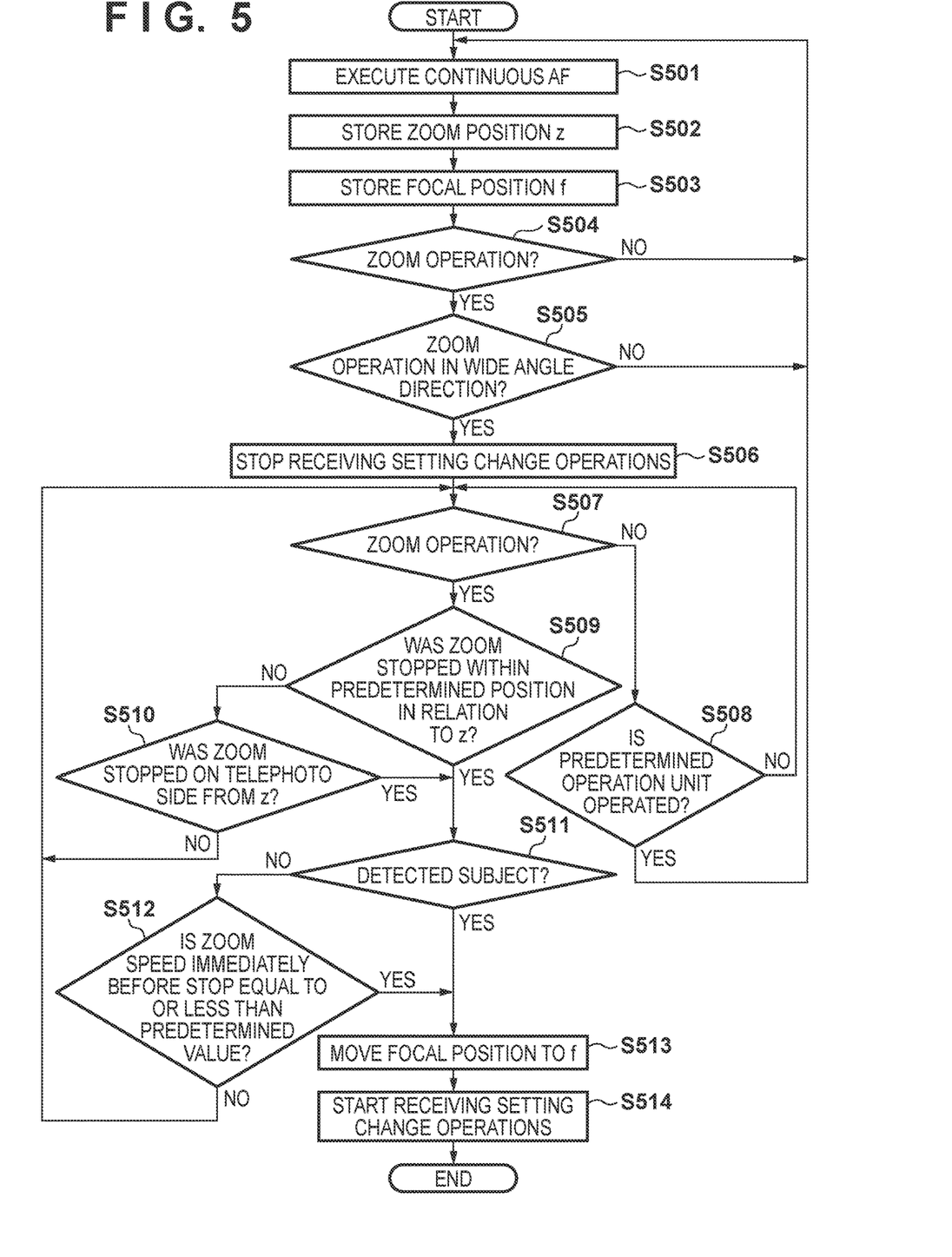
FIG. 5 is a flowchart illustrating the framing assist operation in a fourth embodiment.

FIG. 5 is a flowchart illustrating the framing assist operation in the third embodiment. The processes of step S501 to step S505 are similar to step S201 to step S205, and therefore the explanation thereof is omitted.

In step S506, the control unit 101 stops receiving setting change operations. During the setting change operation reception stoppage, setting changes for a shooting setting item are prohibited. The shooting setting item may be for white balance adjustment, color setting, bracketing, continuous shooting, flash dimming setting, photometry region setting, still image compressibility/number of recorded pixels setting, moving image size setting, focus region (macro region, normal region) switching setting, ISO sensitivity setting, focus lock setting, and AE-lock setting, or the like. The reception of a setting change operation may be stopped for some shooting setting items, and other setting change operations may be received. Setting items for which a setting change may be received may be setting items that are not affected by a change in optical characteristics based on a zoom out (a change of zoom position). For example, these setting items may be settings for switching between continuous shooting and single shooting, image quality (compressibility of image data), image size, ON/OFF of a self-timer, and the number of seconds and images when the self-timer is turned on, ON/OFF of date reflection in shot images, and ON/OFF of blink detection and warning, or the like. On the other hand, it is preferable not to receive setting changes such as for white balance (WB) adjustment, white capture for manual WB, exposure setting (shutter speed, aperture value, exposure correction, AE lock, photometric method), ISO sensitivity, and focus setting. The focus setting may include a setting of a focus adjustment range, focus lock, and an AF type. This is because these items are affected by changes in optical characteristics based on zoom-out, and even if they are adjusted during zoom-out, there is a high possibility that they will not be properly adjusted for images captured after returning to the original zoom position or an even more telephoto position after a subject search.

By stopping the reception of an operation for changing at least some of the shooting setting items in this manner, it is possible to prevent a situation where a shooting setting is changed during the framing assist processing where through image display is performed with the zoom position set to a position that is different to the angle of view at which shooting is actually to be performed, and an image that the user does not intend ends up being shot. It is assumed that the following operations are not the target of prohibition, and are received during this processing: an operation for turning off the power by a power switch; and an operation for switching from the shooting mode to the playback mode for playing back the shot image. Also, it is assumed that when the display unit 130 is a vari-angle monitor, an operation for switching the display destination according to movement of the display unit 130 is also received. As described above, an operation that does not affect the captured image itself is received even during zoom-out.

When the reception of setting change operations is stopped, the process advances to step S507. Step S507 to step S513 is similar processing to step S207 to step S213, and therefore the explanation thereof is omitted.

In step S514, the control unit 1010 starts receiving setting change operations.

Incidentally, in the present embodiment, the reception of an operation for changing a shooting setting item was stopped instead stopping the continuous AF operation, but the first embodiment may be combined to stop the continuous AF operation and stop the reception of an operation for changing a shooting setting item. Further, the second embodiment may be combined to provide a framing assist mode explicitly and stop the reception of an operation for changing a shooting setting item described above only when the framing assist mode is set.

In addition, when the reception of an operation for changing a shooting setting item is stopped in step S506, the display of shooting information on the display unit 130 or the display unit 132 may also be stopped. During a subject search, there is a higher possibility that the subject intended by the user will be positioned in the periphery of a central portion of the capturing area. At this time, if a shooting information display has been displayed on a peripheral portion of the screen, it will become an obstruction to observation of the peripheral portion of the screen. Therefore, the shooting information that has been displayed on the peripheral portion of the screen is deleted so as not to obstruct the observation of the image in the peripheral portion of the screen. In such a case, the displaying of the shooting information is started in step S514.

As described above, during zooming out, a temporary change is made from a state (first processing mode) in which an operation for changing a shooting setting item is received to a state (second processing mode) in which an operation for changing a shooting setting item is not received. The change of the processing performed during zooming out is such that the shooting condition is hardly changed from the shooting condition prior to the subject search. In addition, this can reduce the possibility that an image unintended by the user is captured when the original zoom position or an even more telephoto position is returned to after the subject search.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-130884, filed Jul. 10, 2018, and No. 2019-107455, filed Jun. 7, 2019, which are hereby incorporated by reference herein in their entirety.

What is claimed is:

1. An image capturing apparatus operable to capture a subject image formed by a lens unit having a focus lens and a zoom operation member for performing a zoom operation, the apparatus comprising:
    at least one processor or circuit configured to function as the following units:
        a reception unit configured to receive information of a zoom position of the lens unit;
        a setting unit configured to set a predetermined range on the basis of information of a first zoom position received by the reception unit; and
        a control unit configured to, when the control unit detects during shooting preparation processing that the zoom position of the lens unit has been changed from the first zoom position to a second zoom position more to a wide angle side than the first zoom position, stop at least a part of the shooting preparation processing,
        and, when the control unit detects that the zoom position of the lens unit has changed from the second zoom position to within the predetermined range on a telephoto side from the second zoom position, resume the shooting preparation processing that has been stopped,
    wherein the predetermined range is set to include the first zoom position more to the telephoto side than the second zoom position.

2. The image capturing apparatus according to claim 1, wherein the predetermined range is a range more to the telephoto side than a third zoom position that is a first quantity from the first zoom position to the wide angle side.

3. The image capturing apparatus according to claim 1, wherein the predetermined range is a range from the first zoom position to a telephoto end.

4. The image capturing apparatus according to claim 1, wherein when the control unit detects that the zoom position of the lens unit has been changed from the first zoom position to the second zoom position during the shooting preparation processing, the control unit stops at least the part of the shooting preparation processing by stopping at least one of focus lens position control processing which is based on a focal point detection, automatic exposure setting processing, and white balance control processing.

5. The image capturing apparatus according to claim 4, wherein the shooting preparation processing is at least one of focus lens position control processing which is based on a focal point detection, automatic exposure setting processing, and white balance control processing.

6. The image capturing apparatus of claim 1, wherein
    the control unit performs focus lens position control processing based on focal point detection during the shooting preparation processing, and
    when the control unit detects that the zoom position of the lens unit has been changed from the first zoom position to the second zoom position on a wide angle side from the first zoom position, the control unit stops the focus lens position control processing, and
    when the control unit detects that the zoom position has been changed from the second zoom position to within the predetermined range, the control unit resumes the focus lens position control processing.

7. The image capturing apparatus according to claim 6, further comprising a storage unit configured to store a first focal position at the first zoom position, wherein the control unit causes the focus lens to align with the first focal position, and then resumes driving of the focus lens based on the focal point detection.

8. The image capturing apparatus according to claim 1, wherein
    the at least one processor or circuit is configured to further function as a detection unit configured to detect a subject from a shot image, and
    wherein the control unit controls whether or not to resume the shooting preparation processing further based on whether or not a subject has been detected by the detection unit.

9. The image capturing apparatus according to claim 8, wherein the control unit resumes the shooting preparation processing when a subject is detected by the detection unit.

10. The image capturing apparatus according to claim 1, wherein the control unit controls whether or not to resume the shooting preparation processing further based on a zoom speed immediately prior to a stopping of a zoom operation from the second zoom position to within the predetermined range.

11. The image capturing apparatus according to claim 10, wherein the control unit resumes the shooting preparation processing when a zoom speed immediately prior to a stopping of a zoom operation from the second zoom position to within the predetermined range is less than or equal to a predetermined value.

12. The image capturing apparatus according to claim 1, wherein the at least one processor or circuit is configured to further function as:

a setting unit configured to set a predetermined mode by which the control unit, based on the zoom position, stops at least the part of the shooting preparation processing.

13. A method for controlling an image capturing apparatus for imaging a subject image formed by a lens unit having a focus lens and a zoom operation member for performing a zoom operation, the method comprising:

receiving information of a zoom position of the lens unit;

setting a predetermined range on the basis of information of a first zoom position received in the receiving;

detecting during shooting preparation processing that the zoom position of the lens unit has been changed from the first zoom position to a second zoom position more to a wide angle side than the first zoom position;

stopping at least a part of the shooting preparation processing;

and, when it is detected that the zoom position of the lens unit has changed from the second zoom position to within the predetermined range on a telephoto side from the second zoom position, resuming the shooting preparation processing that has been stopped, wherein the predetermined range is set to include the first zoom position on the telephoto side from the second zoom position.

14. A non-transitory computer-readable storage medium storing a program for causing a computer to perform a method for controlling an image capturing apparatus for imaging a subject image imaged by a lens unit having a focus lens and a zoom operation member for performing zoom operations, the method comprising:

receiving information of a zoom position of the lens unit;

setting a predetermined range on the basis of information of a first zoom position received in the receiving;

detecting during shooting preparation processing that the zoom position of the lens unit has been changed from the first zoom position to a second zoom position more to a wide angle side than the first zoom position;

stopping at least a part of the shooting preparation processing;

and, when it is detected that the zoom position of the lens unit has changed from the second zoom position to within the predetermined range on a telephoto side from the second zoom position, resuming the shooting preparation processing that has been stopped, wherein the predetermined range is set to include the first zoom position on the telephoto side from the second zoom position.

* * * * *